United States Patent
Abarham

(10) Patent No.: US 12,486,657 B2
(45) Date of Patent: Dec. 2, 2025

(54) ANIMAL REVERSER DEVICE

(71) Applicant: Aboutaleb Abarham, Albuquerque, NM (US)

(72) Inventor: Aboutaleb Abarham, Albuquerque, NM (US)

(73) Assignee: AA Innovations LLC, Albuquerque, NM (US)

( * ) Notice: Subject to any disclaimer, the term of this patent is extended or adjusted under 35 U.S.C. 154(b) by 0 days.

(21) Appl. No.: 18/829,327

(22) Filed: Sep. 10, 2024

(65) Prior Publication Data

US 2025/0092660 A1    Mar. 20, 2025

Related U.S. Application Data

(60) Provisional application No. 63/633,055, filed on Apr. 12, 2024, provisional application No. 63/633,054, filed on Apr. 12, 2024, provisional application No. 63/582,850, filed on Sep. 14, 2023.

(51) Int. Cl.
*E03F 7/06* (2006.01)
*A01M 29/34* (2011.01)

(52) U.S. Cl.
CPC .............. *E03F 7/06* (2013.01); *A01M 29/34* (2013.01)

(58) Field of Classification Search
CPC .................................. E03F 7/06; A01M 29/34
USPC ........... 4/679, 378, 584, 613, 650, 668, 671; 137/247.41; 285/134.1
See application file for complete search history.

(56) References Cited

U.S. PATENT DOCUMENTS

| | | | | | |
|---|---|---|---|---|---|
| 1,613,652 | A | * | 1/1927 | Earle | A01M 23/00 43/66 |
| 1,876,127 | A | * | 9/1932 | Kemper | A01M 1/106 4/209 FF |
| 2,532,681 | A | * | 12/1950 | Stover | A01M 23/00 43/131 |
| 2,568,168 | A | * | 9/1951 | Query | A01M 25/004 43/131 |
| 2,856,724 | A | * | 10/1958 | Bodenbach | A01M 29/12 4/209 R |
| 2,860,445 | A | * | 11/1958 | Yates | A01M 23/00 43/131 |
| 2,894,352 | A | * | 7/1959 | Mcdonald | A01M 23/34 43/87 |
| 3,118,469 | A | * | 1/1964 | Schliesser | E03F 7/06 137/527.8 |

(Continued)

FOREIGN PATENT DOCUMENTS

| | | | | | |
|---|---|---|---|---|---|
| BR | 202016006355 U2 | * | 9/2017 | | A01M 1/023 |
| WO | WO-0011944 A1 | * | 3/2000 | | A01M 1/023 |

*Primary Examiner* — Lori L Baker
(74) *Attorney, Agent, or Firm* — KPPB Law; Luis M. Ortiz; Kermit D. Lopez

(57) ABSTRACT

An animal reverser device can include a housing containing a trap zone adapted to prevent animals from entering a premises via sewer-related tubing. A first tubular connection pipe can connect to drain piping and can protrude downward into the housing. An area formed around the outer surface of the first tubular connection pipe within its protrusion within the housing can create the trap zone. A second tubular connection integrated with a bottom of the housing and protruding downward from the housing can be connected to an existing drain trap or sewer line pipe that carries waste away from the premises.

17 Claims, 3 Drawing Sheets

(56) References Cited

U.S. PATENT DOCUMENTS

| | | | | |
|---|---|---|---|---|
| 3,965,607 A * | 6/1976 | Lee | A01M 23/24 | 43/87 |
| 4,162,681 A * | 7/1979 | Patterson | A01K 63/00 | 210/167.26 |
| 4,174,913 A * | 11/1979 | Schliesser | E03F 7/06 | 137/527.8 |
| 4,228,554 A * | 10/1980 | Tumminaro | A01K 1/0121 | 4/300 |
| 4,242,763 A * | 1/1981 | Walker | A01K 1/011 | 4/300 |
| 4,480,655 A * | 11/1984 | Teglund | E03F 5/0402 | 137/138 |
| 4,642,935 A * | 2/1987 | Fierer | A01M 1/24 | 43/131 |
| 4,642,936 A * | 2/1987 | Jobin | A01M 1/026 | 43/122 |
| 4,706,410 A * | 11/1987 | Briese | A01M 1/106 | 43/107 |
| 5,148,626 A * | 9/1992 | Haake, Sr. | A01K 5/0142 | 43/109 |
| 5,157,863 A * | 10/1992 | Godwin | A01M 23/34 | 43/87 |
| 5,293,721 A * | 3/1994 | Richard | A01K 39/0113 | 114/221 R |
| 5,481,766 A * | 1/1996 | Steadman | A01M 29/30 | 4/286 |
| 5,581,934 A * | 12/1996 | Arnold, Sr. | A01M 23/00 | 210/162 |
| 5,661,924 A * | 9/1997 | Maxwell | A01K 97/05 | 43/56 |
| 5,813,166 A * | 9/1998 | Wigton | A01M 1/06 | 43/107 |
| 6,055,766 A * | 5/2000 | Nolen | A01M 1/023 | 43/112 |
| 6,158,165 A * | 12/2000 | Wilson | A01M 1/103 | 43/107 |
| 6,550,181 B1 * | 4/2003 | Ray | A01M 1/2016 | 43/132.1 |
| 6,792,628 B1 * | 9/2004 | Humphrey | A01K 1/0121 | 4/300 |
| 8,220,497 B1 * | 7/2012 | Guarascio | E03F 7/06 | 138/97 |
| 8,382,993 B1 * | 2/2013 | Wisek | E03C 1/26 | 137/550 |
| 9,426,976 B2 * | 8/2016 | Myers | A01M 23/34 | |
| 10,349,649 B2 * | 7/2019 | Cao | A01M 23/34 | |
| 10,458,110 B1 * | 10/2019 | Koosmann | E03F 7/06 | |
| 12,089,669 B2 * | 9/2024 | Memita | A61F 9/045 | |
| 2004/0128903 A1 * | 7/2004 | Wexler | A01M 29/34 | 43/122 |
| 2007/0130819 A1 * | 6/2007 | Ohayon | A01M 1/103 | 43/65 |
| 2009/0151219 A1 * | 6/2009 | Parsons | A01K 75/00 | 43/9.2 |
| 2015/0013058 A1 * | 1/2015 | Bucher | E03D 9/037 | 4/224 |
| 2016/0143263 A1 * | 5/2016 | Myers | A01M 23/34 | 43/87 |
| 2017/0318791 A1 * | 11/2017 | Rawls | A01K 39/0113 | |
| 2018/0016792 A1 * | 1/2018 | Valdez | F16L 37/02 | |
| 2018/0184641 A1 * | 7/2018 | Moga | A01M 23/02 | |
| 2018/0288992 A1 * | 10/2018 | Gallegos | A01M 1/106 | |
| 2021/0015089 A1 * | 1/2021 | Osborne | A01M 23/34 | |
| 2023/0235545 A1 * | 7/2023 | Duban | E03F 5/0404 | 4/679 |

* cited by examiner

ANIMAL REVERSER DEVICE

INVENTION PRIORITY

The current application claims priority to U.S. Provisional Patent Application Ser. No. 63/582,850 filed Sep. 14, 2023, by Aboutaleb Abarham for "Animal Reverser Device", and also claims priority to U.S. Provisional Patent Application Ser. No. 63/633,054 filed Apr. 12, 2024, by Aboutaleb Abarham for "Animal Reverser Device," and also claims priority to U.S. Provisional Patent Application Ser. No. 63/633,055 filed Apr. 12, 2024, by Aboutaleb Abarham for "Animal Reverser Device." The provisional applications are all incorporated herein by reference in their entirety.

TECHNICAL FIELD

The current inventive embodiments are related to traps or deterrence devices adapted for use against rodents and insects. More particularly, the embodiments are related to devices that can be integrated with drain plumbing to prevent rodents and insects, such as mice and cockroaches, from entering the interior of a premises via drains, tubs and sewage pipes.

BACKGROUND

Cockroaches, spiders, mice and rats are common animals and insects (herein commonly referred to as "animals") surviving in various living conditions around buildings serving as a living premises and commercial buildings. These animals can easily access the inside of a premises via sewer pipes and plumbing attached to drains associated with sinks, bathtubs and toilets.

Cockroaches, spiders, mice and rats are common animals that can survive in various living conditions. These animals can carry bacteria such as salmonella, staphylococcus, and streptococcus. Cockroaches can sometimes crawl out of sewage opening into a cockroach free household.

What is needed are devices that can be installed on piping, such as sewage pipes, to effectively prevent animals from passing through sewage openings, such as those found on bathtubs, sinks and toilets.

SUMMARY

In accordance with the embodiments, devices are disclosed that prevent animals from reaching the opening associated with sewer lines that are further associated with a premises.

In an embodiment, an animal reverser device can be installed on sewer tubing between a sink, bathtub or toilet located within a premises and the connection of the sink, bathtub or toilet to sewer lines within the premises that carry waste out of the premises to, for example, a municipality's sewer line, which is generally located beneath the municipality's street near the premises. The animal reverser includes a first (or "top") tubular connection pipe with a first end for connection to drain piping coupled to an existing sink, bathtub or toilet and a second end that protrudes downward into a housing representing the interior of the trap. An area formed around the outer surface of the first tubular connection within its protrusion within the housing can create a trap zone that is effective in preventing animals from entering a premises from the first tubular connection pipe. A second (or "bottom") tubular connection in integrated with the bottom of the housing and protrudes downward from the housing to a third end adapted for connection to an existing sewer line pipe that carries waster away from the premises and to the municipality's sewer line.

Even where a trap zone as described hereinabove can be implemented around existing piping associated with premises plumbing to prevent cockroaches from entering a premises, mice and rats are known to be able to bit onto the edge of pipe openings in order to maneuver from a trap zone created by piping protruding into and formed within an animal reverser housing that is connectable to pipe leading from the sewer line into pipe openings within the premises. Mice can bite onto an edge formed on the second end of the first tubular connection pipe from the trap zone and can swing themselves into the first tubular connection pipe. Therefore, in accordance with another embodiment, an animal reverser device can include a "curbed coupling zone" formed at the second end of the first tubular connection pipe. The curved coupling zone formed within the housing in association with the second end of the first tubular connection pipe is adapted to prevent rodents from biting on the curved coupling zone (because on edge is no longer available) and thereby gaining access through the expanse of tubing into the interior of a premises via the tube drain piping that is typically coupled to an existing sink, tub or toilet. Exit tubing formed at the bottom of the housing of the animal reverser device is connectable to the exiting sewer line that carries waster away from the premises and to the municipality's sewer line.

In accordance with the embodiments, the housing of the animal reverser device can be provided in many shapes. For example, the housing can be providing in the form of a tapered horn or as a ball. A tapered horn can surround premises tubing leading up to a drain opening associated with the premises, the tapered horn thereby creating a trap zone area for animals.

DETAILED DESCRIPTION

Figure 1:
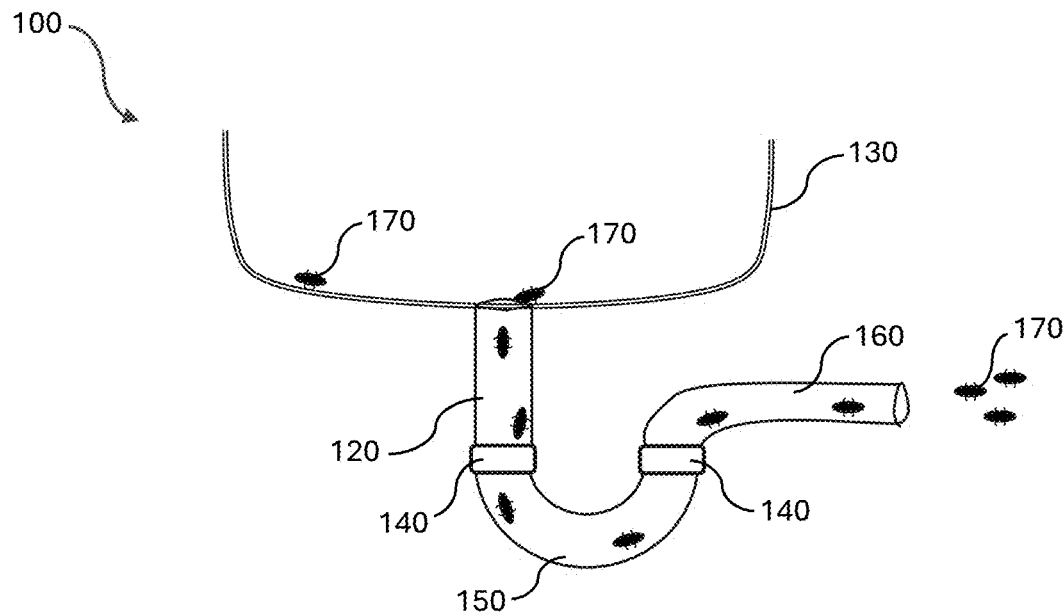
FIG. 1, labeled as prior art, illustrates a side view of a typical premises tubing carrying sewage from a drain associated with a premises to sewage tubing.

Referring to FIG. 1, labeled as Prior Art, a side view 100 of typical premises sewer tubing 110 adapted for carrying sewage from a drainpipe 120 associated with a sink 130 in a premises is illustrated. The drainpipe 120 can be coupled to a sink 130, bathtub drain, shower drain, or toilet drain. The drainpipe 120 for a sink 130 is typically coupled by couplers 140 to curved portion of pipe referred to as a drain trap 140. The drain trap 140 is then coupled 140 to a premises sewer tubing 160 that can carry waste out of the premises to, for example, a municipality's sewer line (not shown) which is typically located beneath a street in front of a premises. An animal 170 can easily traverse the inner surface of premises sewer tubing 160, drain traps 150 and drainpipes 120 and enter into a premises.

Figure 2:
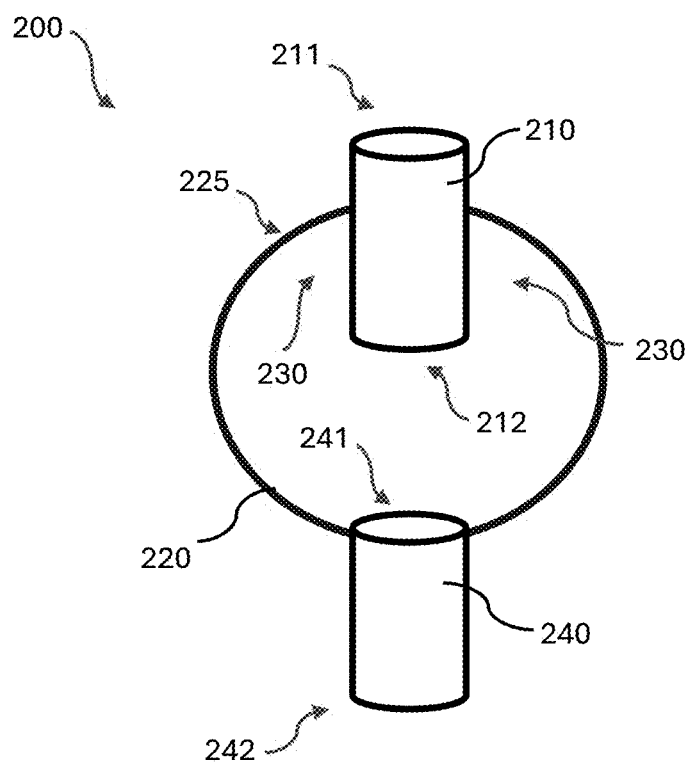
FIG. 2 illustrates a side view of an animal reverser device including a trap zone adapted to prevent animals from entering a premises via sewer-related tubing.

Referring to FIG. 2, illustrated is a side view of an animal reverser device 200 including a trap zone 210 adapted to prevent animals from entering a premises via sewer-related tubing. The animal reverser device 200 includes a first (or "top") tubular connection pipe 210 with a first end 211 for connection to drain piping 120 coupled to an existing sink, bathtub or toilet and a second end 212 that protrudes downward into a housing 220 representing the interior of the animal reverser device 200. An area formed around the outer surface of the first tubular connection pipe 210 within its protrusion within the housing 220 creates a trap zone 230 that is effective in preventing animals from entering a premises from the first tubular connection pipe 210. A second (or "bottom") tubular connection 240 is integrated with the bottom 241 of the housing 220 and protrudes downward from the housing 220 to a third end 242 adapted for connection to an existing drain trap 150 or sewer line pipe 160 that carries waster away from the premises and to the municipality's sewer line. Air holes 225 can also be formed in the trap zone 230 area. Air holes can help facilitate the movement (flow) of sewage/water through the animal reverser device 200. The air holes also attract cockroaches up into the trap zone 230. The holes would be small enough that cockroaches or other animals would not be able to pass through the holes. This embodiment can be effective in preventing, for example, cockroaches from entering the premises through sewer plumbing. Unable to go farther than the trap zone 230, cockroaches will eventually return to the sewer. An animal reverser device can be installed on sewer tubing between a sink, bathtub or toilet located within a premises and the connection of the sink, bathtub or toilet to sewer lines within the premises that carry waste out of the premises to, for example, a municipality's sewer line, which is generally located beneath the municipality's street near the premises.

Figure 3:
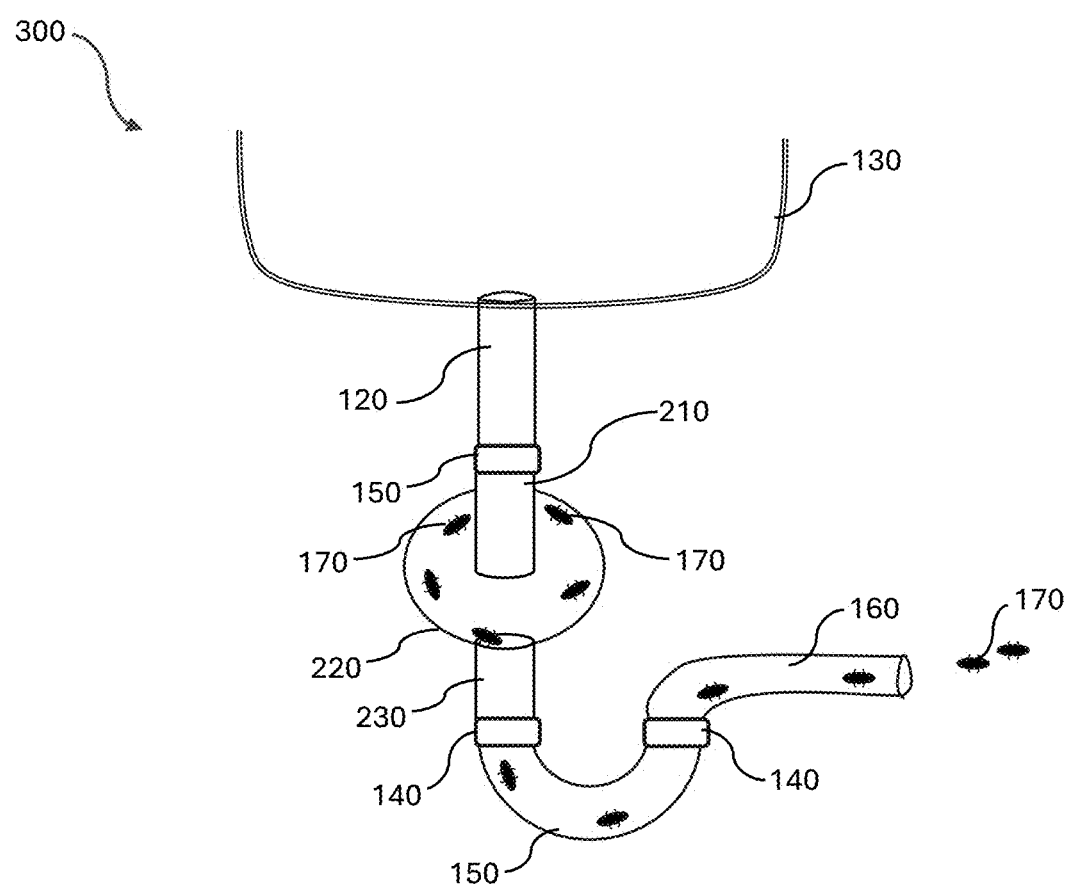
FIG. 3 illustrates the animal reverser device of FIG. 2 installed between drainpipe and an existing drain trap that carries waster away from the premises and to the municipality's sewer line.

Referring to FIG. 3, illustrated is a side view of the animal reverser device 200 of FIG. 2 installed between drainpipe 120 and an existing drain trap 150 and sewer line pipe 160 that carries waste away from the premises and to the municipality's sewer line. Animals 170 are shown trapped within the housing 220 in the trap zones because they cannot enter the first tubular connection pipe 210. This embodiment can be effective in preventing, for example, cockroaches from entering the premises through sewer plumbing.

Figure 4A:
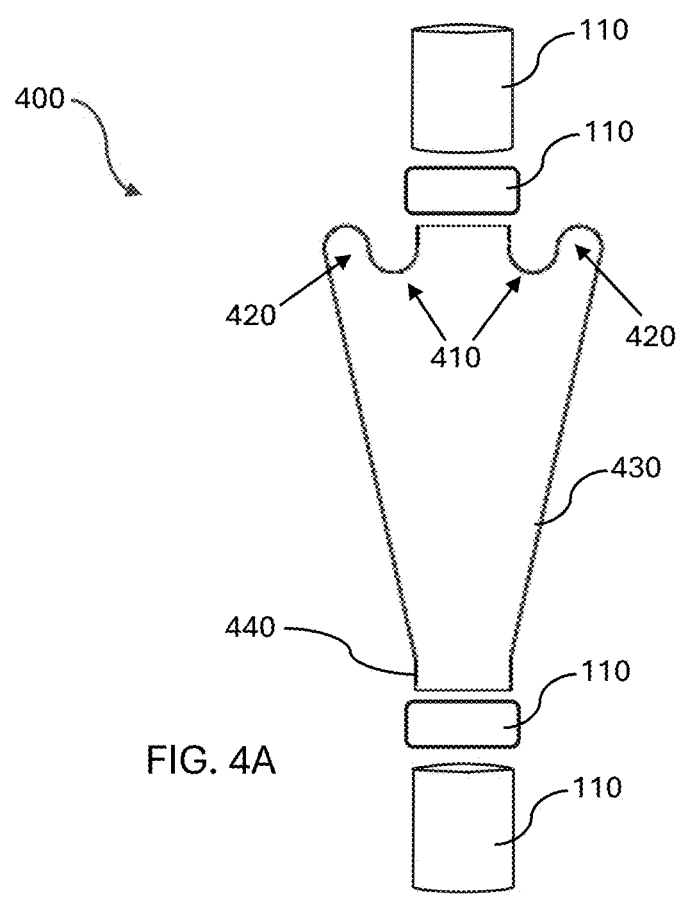
FIGS. 4A-B illustrate side and bottom views of an animal reverser device including a curbed coupling zone adapted to prevent animals from biting the edge of tubing leading from within the housing into the premises via the traps coupling to premises tubing.
Figure 4B:
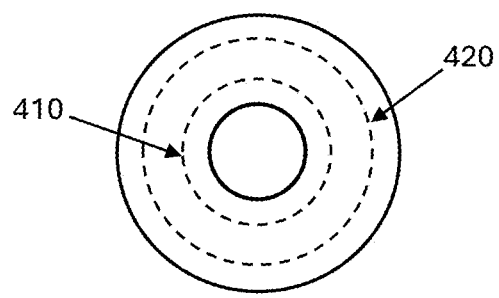

Referring to FIGS. 4A-B, illustrated is a side and a bottom view of an animal reverser device 400 including a curbed coupling zone 410 adapted to prevent animals from biting the edge of tubing that can lead into the housing 430 based on the teaching for FIG. 2.

Even where a trap zone as described hereinabove can be implemented around existing piping associated with premises plumbing to prevent cockroaches from entering a premises, mice and rats are known to be able to bit onto the edge of pipe openings in order to maneuver from a trap zone created by piping protruding into and formed within an animal reverser housing that is connectable to pipe leading from the sewer line into pipe openings within the premises. Mice can bite onto an edge formed on the second end of the first tubular connection pipe from the trap zone and can swing themselves into the first tubular connection pipe. Referring to FIGS. 4A-B, illustrated is a side and a bottom view of an animal reverser device 400 including a curbed coupling zone 410 adapted to prevent animals from biting the edge of tubing that can lead into the housing 430 based on the teaching for FIG. 2, in accordance with another embodiment. The animal reverser device 400 can include a "curbed coupling zone" formed at the second end of the first tubular connection pipe. The curved coupling zone formed within the housing in association with an area that would typically be associated with the second end of the first tubular connection pipe 210 taught with respect to FIG. 2, but here is adapted to prevent rodents from biting on the curved coupling zone (because an edge is no longer available) and thereby gaining access through the expanse of tubing into the interior of a premises via the tube drain piping 120 that is typically coupled to an existing sink 130, tub or toilet. An exit tubing connection area 440 formed at the bottom of the housing of the animal reverser device can be connected to the drain trap 150 or exiting sewer line 160 that carries waster away from the premises and to the municipality's sewer line.

As also shown in FIG. 4A, the housing 430 of the animal reverser device 400 can be provided in many shapes. For example, the housing 400 can be provided in the form of a tapered horn as shown in FIG. 4, or as a sphere as shown in FIG. 2. A tapered horn of FIG. 4A can surround drain tubing 110 leading up to a drain opening of, for example, a sink 130 associated with the premises, the tapered horn thereby creating a trap zone area 420 for animals such as mice or rats.

When an embodiment of the present invention is installed under the sink or wash basin, a cockroach in the sewage pipe is not able to access the opening connected to the sink or wash basin. It cannot crawl up because the gap between the pipes is more than the height of the cockroach.

What is claimed is:

1. An animal reverser device, comprising:
  a housing containing a trap zone adapted to prevent animals from entering a premises via sewer-related tubing;
  a first tubular connection pipe having a first end for connection to drain piping coupled to a existing sink, bathtub or toilet and a second end protruding downward into the housing;
  an area formed around the outer surface of the first tubular connection pipe within the housing creating the trap zone adapted to prevent animals from entering a premises from the first tubular connection pipe, wherein air holes are formed in the trap zone near a top of the housing; and
  a second tubular connection integrated with a bottom of the housing, the second tubular connection protruding downward from the housing to a third end adapted for connection to an existing drain trap or sewer line pipe that carries waste away from the premises.

2. The animal reverser device of claim 1, wherein the housing is shaped like a sphere.

3. The animal reverser device of claim 1, wherein the housing is shaped like a tapered horn.

4. The animal reverser device of claim 1, further comprising a curbed coupling zone formed at a top of the housing where the housing is connectable to a drainpipe.

5. The animal reverser device of claim 1, wherein the curbed coupling zone is adapted to prevent animals from biting the edge of tubing leading into the housing.

6. An animal reverser device, comprising:
  a housing containing a trap zone adapted to prevent animals from entering a premises via sewer-related tubing;

a first tubular connection pipe having a first end for connection to drain piping coupled to a existing sink, bathtub or toilet and a second end protruding downward into the housing;

an area formed around the outer surface of the first tubular connection pipe within the housing creating the trap zone adapted to prevent animals from entering a premises from the first tubular connection pipe;

a second tubular connection integrated with a bottom of the housing, the second tubular connection protruding downward from the housing to a third end adapted for connection to an existing drain trap or sewer line pipe that carries waste away from the premises;

a curbed coupling zone formed at a top of the housing where the housing is connectable to a drain pipe; and air holes formed in the trap zone near a top of the housing.

7. The animal reverser device of claim 6, wherein the housing is shaped like a sphere.

8. The animal reverser device of claim 6, wherein the housing is shaped like a tapered horn.

9. The animal reverser device of claim 6, wherein the curbed coupling zone is adapted to prevent animals from biting the edge of tubing leading into the housing.

10. An animal reverser device, comprising:
a housing containing a trap zone adapted to prevent animals from entering a premises via sewer-related tubing;
a curbed coupling zone formed at a top of the housing; and
a second tubular connection integrated with a bottom of the housing, the second tubular connection protruding downward from the housing to a third end adapted for connection to an existing drain trap or sewer line pipe that carries waste away from the premises, wherein the curbed coupling zone is adapted to prevent animals from biting the edge of tubing leading into the housing.

11. The animal reverser device of claim 10, wherein the housing is shaped like a sphere.

12. The animal reverser device of claim 10, wherein the housing is shaped like a tapered horn.

13. The animal reverser device of claim 10, further comprising air holes formed in the trap zone near a top of the housing.

14. The animal reverser device of claim 10, further comprising air holes formed in the trap zone near a top of the housing.

15. The animal reverser device of claim 14, further comprising air holes formed in the trap zone near a top of the housing.

16. The animal reverser device of claim 10, further comprising a curbed coupling zone formed at a top of the housing where the housing is connectable to the existing drain trap or the sewer line pipe.

17. The animal reverser device of claim 16, wherein the curbed coupling zone is adapted to prevent animals from biting the edge of tubing leading into the housing.

* * * * *